Oct. 20, 1936.  E. E. DOUGHERTY  2,058,141
DOLOMITE CONVERSION
Original Filed Feb. 11, 1925
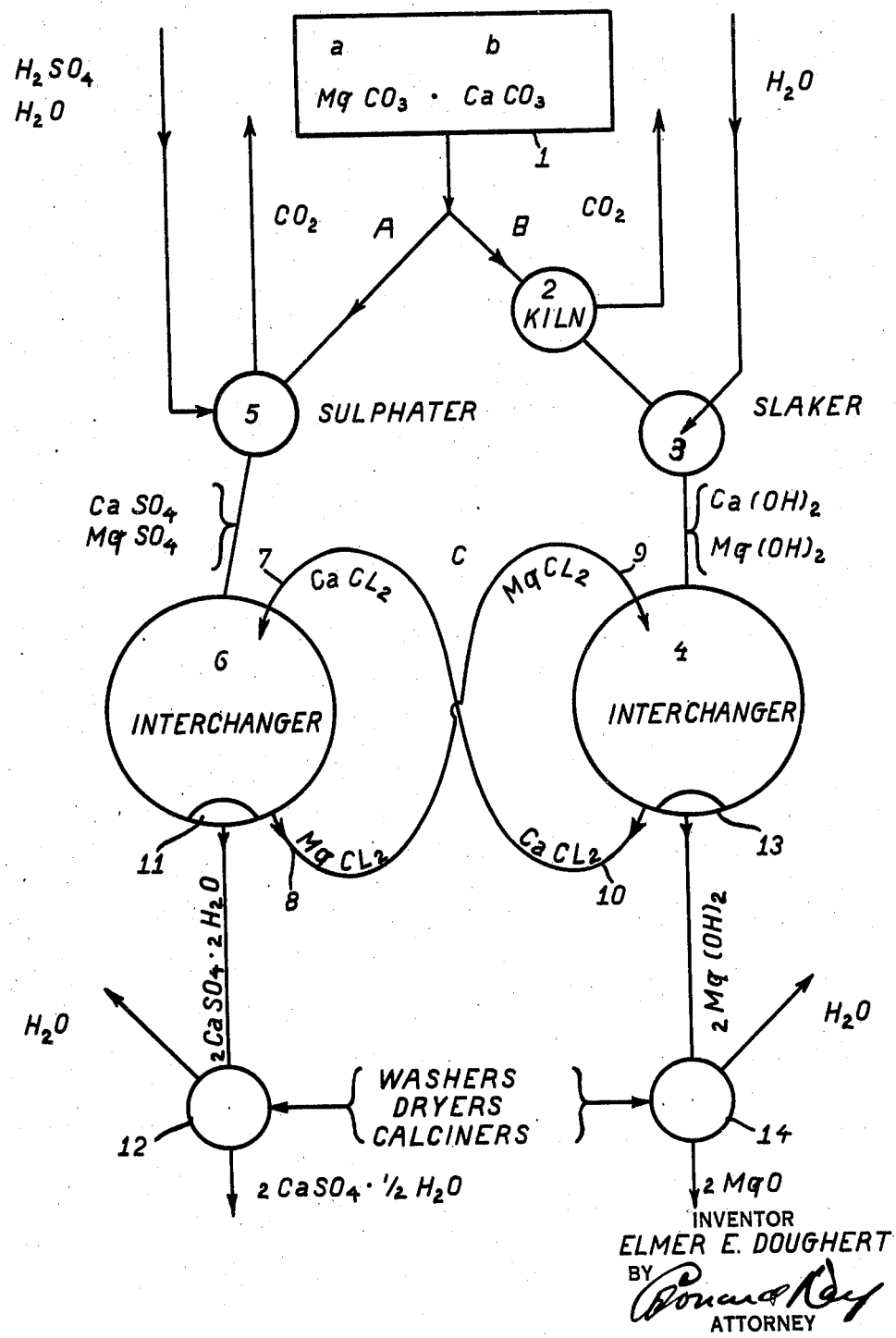
INVENTOR
ELMER E. DOUGHERTY
BY
ATTORNEY Patented Oct. 20, 1936

2,058,141

UNITED STATES PATENT OFFICE 2,058,141

DOLOMITE CONVERSION

Elmer E. Dougherty, Glen Ridge, N. J., assignor, by mesne assignments, to Polytechnic Development Corporation, a corporation of New York Application February 11, 1925, Serial No. 8,542
Renewed January 26, 1934

3 Claims. (Cl. 23—122)

This invention relates to the recovery in chemically pure form of both the magnesium and the calcium from mixtures and compounds containing calcium and magnesium. More particularly the invention relates to the recovery in the form of commercially valuable pure compounds of both the magnesium and the calcium contents of dolomite.

Although the invention is directed broadly to a process for dividing any product containing magnesium and calcium into physically readily separable substantially pure magnesium and calcium compounds, it is to be understood to apply to magnesite, mixtures of magnesite and dolomite and to similar products containing serpentine. And it is by no means limited to natural products containing magnesium and calcium.

The objective of the invention is at least two fold, both rendering the mechanical separation of the magnesium from calcium contents possible, and the obtaining of a chemically pure compound of the magnesium and the calcium as a result of the process. It is, therefore, also an object of the invention to process the raw material in such a way as to eliminate impurities from the finished products resulting therefrom.

In the following specification, two processes, a preferred and an alternate will be described, and it is to these processes that these claims are directed and not limited.

The single sheet of drawing shows a flow sheet diagrammatically illustrative of the invention.

In view of the fact that dolomite constitutes perhaps the cheapest natural product upon which to practise the process, it has been selected as the product to illustrate the same. Dolomite is understood to have a composition of about molecular proportions of calcium carbonate and magnesium carbonate with an admixture to a greater or lesser extent of mineral or other impurities. These impurities are often silica. For the sake of illustration dolomite is assumed to have the following theoretical composition under the preferred method of practising my invention.

|  | Per cent |
|---|---|
| MgO | 21.86 |
| CaO | 30.40 |
| $CO_2$ | 47.74 |
| Total | 100 | or

|  | Per cent |
|---|---|
| $MgCO_3$ | 45.73 |
| $CaCO_3$ | 54.27 |
| Total | 100 |

I first dissolve one batch of dolomite in hydrochloric acid which may be designated as step A'. I also leach another batch of dolomite with sulphuric acid which may be designated as step A. A third batch of dolomite I calcine and designate this step B. The calcines from step B are then hydrated with water to form the hydroxides, which I designate step C. The double chlorides resulting from step A' acting as double chloride carriers are then brought into reaction with the hydrated calcines of step C, and this step is designated D. In this step D there results soluble calcium chloride and insoluble magnesium hydroxide. The latter may be easily filtered, while the former the calcium chloride in solution is brought into relation with the mixed sulphates of step A to form soluble magnesium chloride and calcium sulphate as a precipitate. This is step E and results in the easily, separable calcium sulphate, by a simple filtration process. The magnesium chloride from step E is then subjected under proper conditions to reaction with the hydrated calcines from step C to form again calcium chloride in solution and more precipitated magnesium hydroxide. The calcium chloride from this last step F is then carried back to repeat over and over again the cycle E, F, calcium sulphate being precipitated and separated out in step E and magnesium hydroxide in step F.

For the best understanding of these steps references may be had to the following chart in which the reactions are given in the form of equations:

A'. *Dissolving dolomite in HCl*

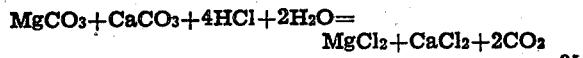

A. *Leaching dolomite with $H_2SO_4$*

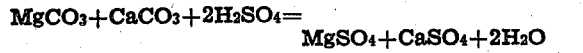

B. *Calcining dolomite*

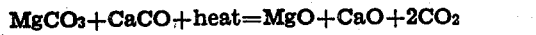

C. *Hydrating calcines*

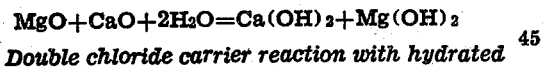

D. *Double chloride carrier reaction with hydrated calcines, a'+c*

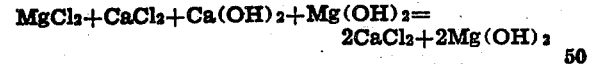

E. *Chloride carrier reaction with sulphates, d+a*

F. *Chloride carrier action with hydrated calcines, e+c*

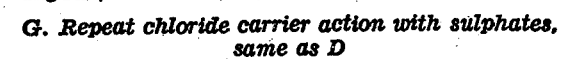

G. *Repeat chloride carrier action with sulphates, same as D*

It should be understood, however, that the equations do not give the necessary water to make up the solutions. It being understood that water in appropriate quantities to cause a flow of the various reagents from one tank to another and to further filter the process is contemplated.

It is also contemplated that instead of starting the process with step A' using hydrochloric acid to obtain suitable acid radical carriers, that commercial calcium chloride may be employed and introduced into the process at step E, after which the chlorine radical becomes usable over and over again, as the acid radical carrier only those losses incidental to all commercial actions having to be made good by a renewal supply.

Likewise, it is, of course, to be understood that the step designated A' is to be practised only when the process is to be started for the first time. The real cycle of the process should comprise the steps E and F except for the fact that constant supplies of dolomitic products must be maintained from steps A and C. It is also to be understood that anyone of the magnesium or calcium compounds resulting from steps E and F are physically separable, the one from the other. On account of a difference in water solubility, the compound may be taken out of the process as a product for sale, but of course, at the expense of supplying the appropriate radical eliminated from the process as a finished product in this manner.

For example, if calcium sulphate and magnesium hydroxide are the finished products removed and sold the radical SO4 must be renewed and also the radical (OH) which may be done in the manner indicated in steps A, B, and C. Again if the magnesium chloride of step E is removed as a finished product the chlorine radical must be constantly supplied. This may conveniently be done by introducing a constant new supply of this radical in the form of calcium chloride. Still again if calcium chloride is one of the products constantly being removed the chlorine radical must be subject to an equal renewal, which may be accomplished either through the medium of hydrochloric acid or magnesium chloride or any other appropriate source.

Preferentially the products removed for sale are calcium sulphate which may later be calcined to form plaster of Paris, magnesium hydroxide which may later be calcined to magnesium oxide and also magnesium chloride. As has been previously stated if the three enumerated products are removed, there must be a constant renewal of the acid radical chlorine and this is preferably accomplished by renewing the amounts of calcium chloride.

When only the calcium sulphate and the magnesium hydroxide are removed from the cycle, no chlorine radical has to be renewed except to make up incidental losses, and the raw materials thus supplied to steps A and C, namely sulphuric acid and dolomite, are adequate.

As an alternative process nitric acid may be substituted for hydrochloric acid in step A' so that throughout the remainder of the steps, the chlorine radical is substituted by the corresponding radical NO3 from the nitric acid.

In the selection of various radicals functioning in the process care should be taken to see that they are not such as to render a water soluble solution of the natural impurities, of the product under treatment such as dolomite. This is true for the radicals of sulphuric acid, hydrochloric acid and nitric acid described above. The silica forming the principal impurity in dolomite, therefore, forms a sludge in the bottom of the vats in which the dolomite is treated, and is filtered off before either of the sulphates are subjected to reaction with the acid radical carriers.

The inventive thought may have a variety of expressions as is contemplated by what I claim and desire to secure by United States Letters Patent as follows:

I claim:

1. The process of separating and recovering commercially both the magnesium content and the calcium content of a substance such as dolomite in connection with which the practical separation is difficult comprising employing two separate pathways A and B for the passage of said substance each pathway having a means for removing solids from liquids; into pathway A introducing said substance along with sulphuric acid; introducing said substance into pathway B in the form of hydroxides; then cycling a chloride carrier solution first across pathway A where it enters as calcium chloride to change the magnesium to magnesium chloride in solution and the calcium to calcium sulphate; removing the calcium sulphate; then, as a part of the cycle, conveying said cycling chloride carrier as magnesium chloride into and across pathway B to convert there the calcium into calcium chloride solution and the magnesium into separable magnesium hydroxide; then conveying this converted chloride carrier solution across pathway A in repetition, whereby the cycling chloride carrier is always a liquid to permit easy conveyance between pathways A and B.

2. The process of recovering magnesium and calcium as a separate compound from mixtures of magnesium and calcium compounds comprising dividing a mass of said mixtures into two parts; sulphating one part; hydroxidizing the other part; adding a water solution of calcium chloride to said sulphated part; removing the resulting magnesium chloride solution; and adding said magnesium chloride solution to said other part.

3. The process of recovering magnesium as a separate compound from mixtures of magnesium and calcium compounds comprising dividing a mass of said mixture into two parts; reacting one part with a water solution of sulphuric acid and then with a water solution of calcium chloride; removing magnesium chloride in water solution; hydroxidizing the other part; adding some of said magnesium chloride solution to said hydroxidized part and removing solid magnesium hydroxide.

ELMER E. DOUGHERTY.